Aug. 25, 1970 S. R. GERFAST 3,525,463

INSTANT STOP DEVICE

Filed June 21, 1968

INVENTOR.
STEN R. GERFAST
BY Kinney, Alexander
Sell, Steldt & DeLaHunt
ATTORNEYS 3,525,463
INSTANT STOP DEVICE Sten R. Gerfast, St. Paul, Minn., assignor to Minnesota Mining and Manufacturing Company, St. Paul, Minn., a corporation of Delaware Filed June 21, 1968, Ser. No. 739,076
Int. Cl. B65h 25/32
U.S. Cl. 226—48 3 Claims

ABSTRACT OF THE DISCLOSURE

This invention is directed to a device for instantly stopping the travel or motion of a web such as a recording tape. It comprises a stop member adapted to simultaneously disengage the tape from a capstan and press the tape firmly against a pressure roller to stop tape motion and hold it in stationary position. Upon release of the stop member, the pressure roller re-engages the tape with the rotating capstan so that the tape instantly resumes the desired rate of travel.

BACKGROUND OF THE INVENTION

This invention relates to an instant or quick stop device to arrest the travel of a web without a significant time interval between actuation of the stop mechanism and actual stopping of the web. The device is especially adaptable for use with recording and/or sound reproducing devices using magnetic tape.

In using systems of this nature it is often desirable to momentarily interrupt tape motion for editing or making fine adjustments to the recorder or reproducer. After interruption, the tape must be returned to the desired rate of travel without damage to the tape. Prior art devices for interrupting movement of recording tapes have in general utilized the principle of disengaging the pressure roller and tape from the capstan and at the same time applying a braking force to one or both of the reels used for winding and unwinding the tape. For example, Louzil, U.S. Pat. 3,282,522 shows a brake for applying the retarding force to the flywheel of the supply reel. Actuation of the stop key moves the brake into braking engagement with the flywheel and removes the pressure roller from engagement with the capstan. These actions are against the force of an electro-magnet. The electro-magnet removes the brake from braking engagement with the flywheel and returns the pressure roller into engagement with the capstan as soon as finger pressure on the stop key is released. Mechanical linkage is required between the reel brake and the pressure roller to simultaneously apply the braking force and disengage the roller from the capstan.

Other prior art devices rely solely on mechanical linkage connected to the stop key to apply and release the braking force to the tap reel system and simultaneously disengage and re-engage the tape with the capstan. In these systems a series of linkages must be used to interconnect the reel braking system with the means to move the tape away from and into driving engagement with the capstan so that tape travel can be effectively interrupted and advanced.

SUMMARY OF THE INVENTION

The instant stop device disclosed by this invention comprises a pause roller or stop member secured to a pivotally mounted pause arm. The stop member is brought into contact with both the tape and pressure roller upon pivotal movement of the arm by an actuating force such as a manually operated key. This contact simultaneously removes the tape and pressure roller from driving engagement with the capstan and presses the tape firmly against the disengaged pressure roller to secure the tape in stationary position. The arm being resiliently biased, returns to its initial position upon release of the actuating force. Return of the arm allows the pressure roller to return the tape back into frictional driving engagement with the rotating capstan. Thus, by simple pivotal movement of the stop member across the tape path toward the pressure roller, the member simultaneously removes the tape from driving engagement with the capstan and presses the tape firmly against the pressure roller so that tape travel is instantly and effectively arrested. Arresting pressure is released as soon as finger pressure is removed from the key. The device avoids the need for synchronized mechanical systems to apply and remove a braking force to the reel assembly and at the same time move the tape out of and back into driving engagement with the capstan. Complicated linkage and timing adjustments inherent in prior stop mechanisms are eliminated in the present invention.

The pause arm may be conveniently mounted on the undersurface of the bridge or housing on which the magnetic recording head and pressure roller are usually mounted. The pause arm can be actuated by connecting it to a stop key through a spring-loaded link or alternately by means of a solenoid connected to the arm and suitably actuated by depressing and releasing the stop key.

DESCRIPTION OF THE DRAWING

An understanding of the invention will be facilitated by referring to the accompanying drawings in which like numerals refer to like parts in the several views and in which.

DETAILED DESCRIPTION

Figures 1, 2, 3:
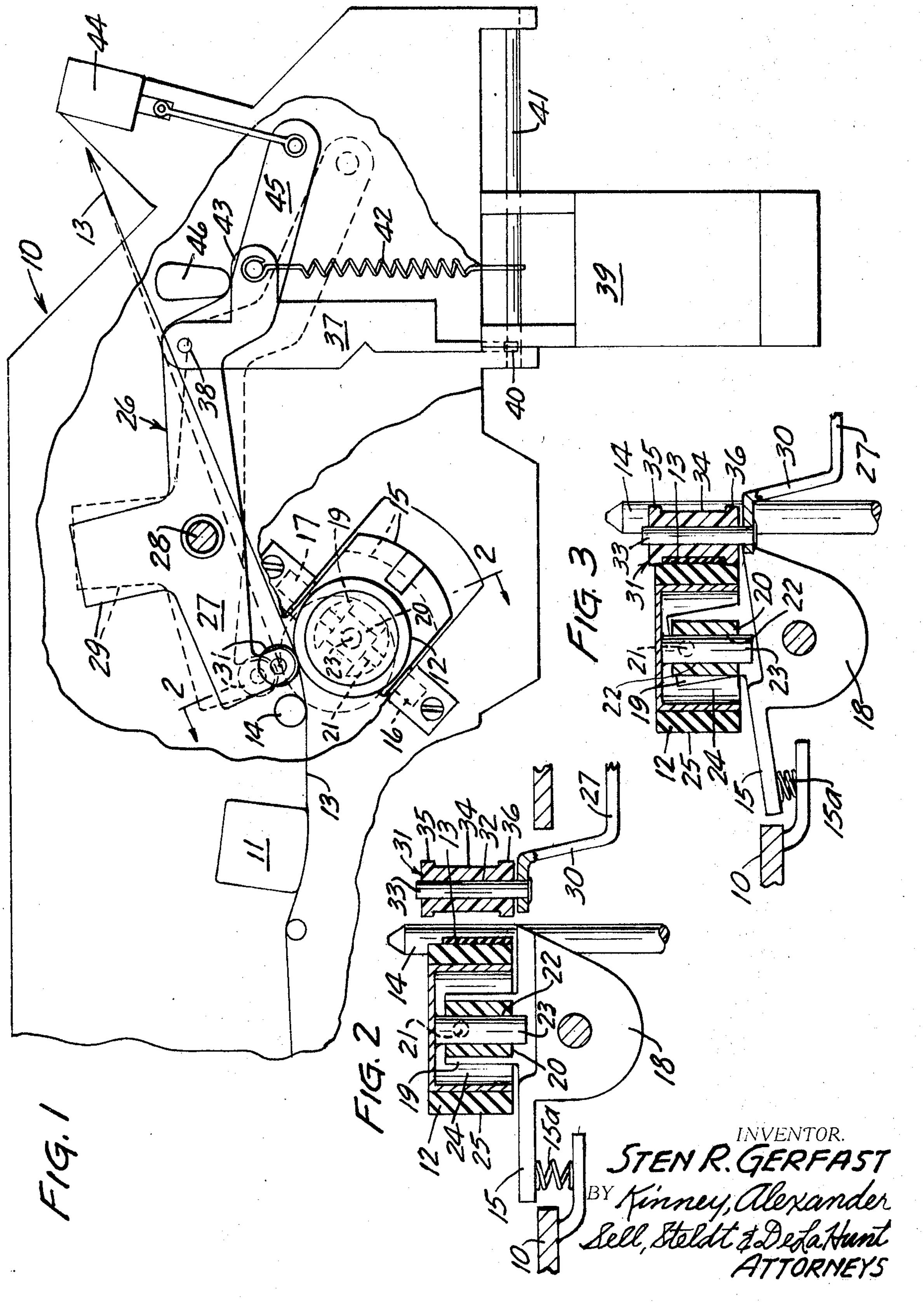
FIG. 1 is a top plan view of the tape bridge for a recording and/or sound reproducing device partially broken away to show the instant stop device in "off" and "stop" positions.
FIG. 2 is a sectional view taken generally along the lines and in the direction of the arrows 2—2 of FIG. 1 showing the stop member of the device in "off" position.
FIG. 3 is a sectional view taken generally along the lines and in the direction of the arrows 2—2 of FIG. 1 showing the stop member of the device in "stop" position.

While the embodiment of the invention shown in the drawings and described below is adaptable primarily for use in conjunction with magnetic tape recorders and/or sound reproducers, it is understood that the invention can be modified for use with other mechanisms where it is desired to instantly arrest and interrupt the travel of a web such as video tape devices, motion picture editing equipment, etc. The device is easily adapted to environments where a web is driven by a drive wheel in association with pressure or guide rollers.

In the embodiment shown in the drawings, the instant stop device is operated in association with the capstan and pressure roller of a tape recorder. Referring to FIG. 1, the quick stop mechanism per se is mounted to the undersurface of a housing or bridge generally designated by the numeral 10. In conventional tape recorders the bridge is usually disposed over the capstan drive system and provides a mounting surface for a magnetic recording head 11 and a cylindrical pressure roller 12. A magnetic tape supply and take up system (not shown in the drawings) is suitably mounted so that magnetic tape 13 can be threaded past the recording head and into driving engagement with a capstan 14. Tape 13 is driven at a constant rate of travel by rotation of the capstan past the recording head 11 and over the surface of bridge 10 in the direction of the arrows in FIG. 1. The driven tape is then usually wound onto a take-up reel associated with the tape supply system.

Pressure roller 12 is normally disposed in the broken line position of FIG. 1. In this position it forces the tape to follow the broken line pathway of FIG. 1 partially around the periphery of capstan 14. The pathway orients the tape into firm frictional driving engagement with the rotating capstan.

Pressure roller 12 is mounted on a platen 15 preferably molded of plastic. The platen is pivotally secured to housing 10 by means of trunnions 16 and 17 integrally formed with and laterally extending from an arcuate base 18 of the platen. Platen 15 is resiliently biased by suitable means such as spring member 15*a* to normally dispose the platen and roller 12 in the broken line position of FIG. 1 and in the position shown in FIG. 2. A pair of spaced parallel flanges 19 are integrally formed on the upper surface of the platen (only one of such flanges is shown in the drawings). Flanges 19 support a gimbal 20 between them as visualized by viewing FIGS. 2 and 3. Gimbal 20 is secured to each of the flanges by a pair of laterally extending pins 21 (one pin shown in the drawings) mounted in apertures in each of the flanges so that the gimbal will rotate about the axis of the pins 21 and maintain the roller in proper orientation with the tape, capstan and the stop member. The gimbal has an aperture 22 for journaling a free ended shaft 23 extending axially from the top end wall of the cylindrical roller 12. The roller, preferably fabricated of metal, has a hollow core 24 which concentrically fits around the flanges 19 and gimbal 20 so that the roller can freely rotate on the axis of shaft 23 journaled in aperture 22 of the gimbal which aperture extends normal to the axis of pins 21. As seen in FIGS. 2 and 3, a suitable layer of rubber or vinyl is laminated to the peripheral surface of the pressure roller to form a compressable surface 25. Surface 25 compresses slightly in the area contacted by tape 13. The area of surface 25 not covered by the tape is in direct contact with capstan 14 when the roller 12 is in the broken line position of FIG. 1. The rotation of the capstan drives the tape 13 and rotates roller 12 on its journaled shaft 23'.

Referring to FIG. 1, the stop device or mechanism per se, generally designated by the numeral 26, comprises a pause arm or lever 27 pivotally mounted for partial rotation on the undersurface of bridge 10 by a pintle 28 so that arm 27 can move a stop member transversely of the tape path and into and out of engagement with tape 13 and pressure roller 12. The upper end of pintle 28 is suitably secured to bridge 10 and arm 27. It distal end is secured to one of the ends of a U-shaped member 29, only the top of member 29 is shown in the drawings. Member 29 is integrally formed with arm 27 to provide additional length to the pintle. The added length of pintle 28 assists in stabilizing the arm 27 throughout its pivotal movement.

As best seen in FIGS. 2 and 3 the end of arm 27 adjacent capstan 14 and pressure roller 12 has an integral upstanding stop support 30. Support 30 terminates adjacent the lower rim of the pressure roller and is crimpled to mount the pause roller or stop member generally designated 31. Stop member 31 has an aperture 32 to receive a fixed spindle 33 suitably secured to the crimped section of support 30 for rotatably mounting the stop member to the support. Further, referring to FIGS. 2 and 3, it is seen that the stem or shank 34 of stop member 31 is spaced between a pair of flanges 35 and 36 which protrude from the surface of shank 34 a minute distance in the range of .007 and .010 inch. This protrusion is slightly greater than the thickness of tape 13. Additionally, the space between flanges 35 and 36 along the surface of shank 34 is slightly greater than the width of tape 13. As stop member 31 moves into engagement with the tape 13 and the roller 12, the first points of contact will be between flanges 35 and 36 and the compressable surface 25 of the roller.

Referring to FIG. 1, arm 27 is partially rotated on pintle 28 by means of an actuating link 37 secured to the arm 27 by a rivet 38. The distal end of link 37 is fastened to an actuating or stop key 39 by means of a stud 40 integrally formed at one side of the key. Stop key 39 is pivotally mounted on a metal support rod 41, the latter being suitably secured to a marginal edge of bridge 10.

In operation, mechanism 26 is moved between the "off" position shown by the broken lines of FIG. 1 and the operative or "stop" position shown by the solid lines of FIG. 1.

Mechanism 26 is normally biased to the "off" position by a spring 42 interconnected between rod 41 and a spring tab 43, the latter being integrally formed on link 37 adjacent its juncture with arm 27. When mechanism 26 is in "off" position, pivotable platen 15 biases pressure roller 12 to the broken line position of FIG. 1 to press tape 13 and the roller into frictional driving engagement with the capstan 14. To move mechanism 26 to the "stop" position, key 39 is depressed moving the actuating link 37, which in turn partially rotates pause arm 27 on pintle 28, to bring the stop member 31 into engagement with tape 13 and the surface 25 of the pressure roller 12. Initial contact with roller surface 25 is made by the flanges 35 and 36 which compress the resilient surface. After initial contact, shank 34 contacts tape 13 and presses it firmly against surface 25 of the roller. Engagement of stop member 31 with the pressure roller 12 causes platen 15 to pivot to the solid line position of FIG. 1 and the position of FIG. 2. Pivotable movement of the platen moves the pressure roller out of engagement with the capstan. Inasmuch as tape 13 is firmly pressed against surface 25 by shank 34 and has been moved out of driving engagement with the capstan, tape travel is completely arrested. Although the take-up reel system remains energized throughout the "stop" movement, the tape is firmly held against the pull of the take-up reel, the latter including a slip clutch to avoid stretching or otherwise damaging the tape.

Upon release of key 39, spring 42 will instantly return the mechanism 26 to the "off" position thus releasing the pressure of stop member 31 against tape 13 and roller 12. Platen 15 being resiliently biased returns pressure roller 12 and tape 13 back into driving engagement with capstan 14. The rotation of the capstan is not interrupted during the operation of the stop mechanism so that the tape may resume its normal rate of travel as soon as the pressure roller is re-engaged with the capstan.

If it is desired to actuate arm 27 by electromagnetic means, link 37 and spring 42 may be eliminated and a solenoid generally designated by the numeral 44, is connected to a tie rod 45 integrally formed with and extending from arm 27 as seen in FIG. 1. A suitable switch responsive to the movement of stop key 39 is connected to the circuit of the recorder or sound producer to actuate the solenoid which in turn moves the stop mechanism 26 to "stop" position when the solenoid is energized and to "off" position when the solenoid is de-energized. Additionally, the partial rotation of arm 27, if moved either manually or by the solenoid 44, may be limited by a stop member 46 integrally formed on the undersurface of bridge 10.

In the embodiment shown in the drawings, the stop member 31 is mounted for rotation on support 30. In event inadvertent movement of the stop key brings stop member 31 into partial engagement with tape 13 and does not fully move the pressure roller out of contact with the capstan, the stop member will then rotate due to its engagement with the rotating pressure roller and capstan preventing any "spillage" of tape between the stop member and capstan. However, stop member 31 will effectively arrest tape travel when the pressure roller is lifted from the capstan, and whether the stop member 31 is a stationary pin or a rotatable roller, as illustrated, may depend upon the actuator used to move mechanism 26.

Having thus described the invention, what is claimed is:

1. An instant stop device for stopping the movement of a web driven by a capstan and pressed into driving engagement with the capstan by a resiliently mounted pressure roller, the device comprising:

(a) a stop member rotatably mounted adjacent said capstan and pressure roller having a cylindrical shank portion in parallel alignment with the axis of rotation of said stop member, said stop member movable into engagement with said pressure roller and web, the cylindrical shank portion thereof engaging said web, to simultaneously move said web and pressure roller from driving engagement with said capstan and press said web against said pressure roller to stop movement of said web, the stop member being further movable out of engagement with said pressure roller to press said web into driving engagement with said capstan; and (b) lever means to move said stop member into and out of engagement with said pressure roller and web.

2. An instant stop device for stopping the movement of a tape driven normally along a predetermined tape path past the magnetic head of a tape recorder by a capstan upon being pressed into driving engagement with said capstan by a pressure roller, the device comprising:

(a) a resiliently mounted platen for supporting said pressure roller and urging said pressure roller into engagement with said tape and capstan;

(b) a lever mounted for movement between a first and second position, one end of the lever being disposed in spaced relation with and on the same side of the tape path as said capstan when said lever is in said first position;

(c) a stop member rotatably mounted on said one end of said lever and movable therewith when said lever is moved from said first position to said second position to move said one end and the stop member in a direction across said tape path to engage said pressure roller and said tape for simultaneously moving said tape against said pressure roller and said pressure roller from driving engagement with said capstan against the force of the resiliently mounted platen supporting said pressure roller to stop the movement of said tape, said stop member being disposed out of engagement with said tape and pressure roller when said lever is returned to said first position to allow the resiliently mounted platen supporting said pressure roller to move the roller for pressing said tape into driving engagement with said capstan;

(d) a gimbal pivotably mounted on said resiliently mounted platen for journaling said pressure roller, the pivotable mounting of said gimbal maintaining the axis of rotation of said pressure roller in parallel orientation with the vertical axis of said tape when said lever is in said first and second positions and with the axis of rotation of said stop member when said lever is in said second position; and (e) means to move said lever from one of said positions to the other.

3. An instant stop device for stopping the movement of a tape driven normally along a predetermined tape path past the magnetic head of a tape recorder by a capstan upon being pressed into driving engagement with said capstan by a resiliently mounted pressure roller having a compressible surface, the device comprising:

(a) a lever mounted for movement between a first and second position, one end of the lever being disposed in spaced relation with and on the same side of the tape path as said capstan when said lever is in said first position;

(b) a stop member rotatably mounted on said one end of said lever having a cylindrical shank disposed between two axially spaced protruding flanges, the protrusions thereof being greater than the thickness of said tape and the length of said shank between said flanges being at least as long as the width of said tape, said stop member movable with said lever when said lever is moved from said first position to said second position to move said one end of said lever and stop member in a direction across said tape path to initially press the flanges of said stop member against the compressible surface of said pressure roller and engage said shank with said tape and subsequently press said tape by means of said shank against said pressure roller to move said pressure roller from driving engagement with said capstan against the force of the resilient mounting of said pressure roller to stop the movement of said tape, said stop member being disposed out of engagement with said tape and pressure roller when said lever is returned to said first position to allow said resiliently mounted pressure roller to press said tape into driving engagement with said capstan;

(c) a gimbal to pivotably journal said pressure roller for maintaining the axis of rotation of said pressure roller in alignment with the vertical axis of said tape and stop member; and (d) means to move said lever from one of said positions to the other.

References Cited

UNITED STATES PATENTS

| | | | |
|---|---|---|---|
| 2,590,665 | 3/1952 | Williams | 226—48 |
| 2,851,676 | 9/1958 | Woodcock | 226—155 X |

RICHARD A. SCHACHER, Primary Examiner

U.S. Cl. X.R.

226—154, 187

UNITED STATES PATENT OFFICE
CERTIFICATE OF CORRECTION

Patent No. 3,525,463 Dated August 25, 1970

Inventor(s) Sten R. Gerfast

It is certified that error appears in the above-identified patent and that said Letters Patent are hereby corrected as shown below:

Column 1, line 55, cancel "tap" and insert --tape--. Column 3, line 7, cancel "trumnions" and insert -- trunions --; Column 3, line 37, cancel "23'" and insert --23--; Column 3, line 45, cancel "It" and insert --Its--; Column 3, line 54, cancel "crimpled" and insert --crimped--.

SIGNED AND SEALED DEC 8 - 1970

(SEAL)
Attest:

Edward M. Fletcher, Jr.
Attesting Officer

WILLIAM E. SCHUYLER, JR.
Commissioner of Patents